Aug. 9, 1949.  H. C. DONER  2,478,254
SERVING WAGON
Filed Feb. 10, 1944  2 Sheets-Sheet 1

Inventor
HALBERT CRESTON DONER
By Frank Fraser
Attorney

Inventor
HALBERT CRESTON DONER

Patented Aug. 9, 1949

2,478,254

UNITED STATES PATENT OFFICE 2,478,254

SERVING WAGON

Halbert Creston Doner, Toledo, Ohio, assignor to Libbey-Owens-Ford Glass Company, Toledo, Ohio, a corporation of Ohio Application February 10, 1944, Serial No. 521,887

1 Claim. (Cl. 219—19)

The present invention relates to a novel type of serving wagon and more particularly to a specially designed unit of this general character embodying a portable cupboard and hot food server.

The apparatus of the invention forms a part of a comprehensive and revolutionary setup of kitchen and dining equipment, other and cooperating units of which have already been disclosed in detail in my Design Patents No. 135,813, dated June 15, 1943, "Wall cabinet"; No. 135,842, dated June 22, 1943, "Combination kitchen unit"; and in my copending applications Serial No. 466,582, filed Nov. 23, 1942 and issued Jan. 4, 1949 as Patent No. 2,457,877, "Cooking unit"; Serial No. 467,605, filed Dec. 2, 1942, "Combination oven unit"; Serial No. D. 111,215, filed Sept. 27, 1943, (now Design Patent No. 137,946) "Mixing device"; Serial No. D. 111,216, filed Sept. 27, 1943, (now Design Patent No. 139,245) "Tea wagon"; Serial No. D. 111,217, filed Sept. 27, 1943, (now Design Patent No. 137,861) "Combined table and wall plaque"; Serial No. D. 111,218, filed Sept. 27, 1943, (now Design Patent No. 137,791) "Combined refrigerator cabinet and partition"; and Serial No. D. 111,219, filed Sept. 27, 1943, (now Design Patent No. 137,792) "Combination oven unit."

Generally speaking, the primary purpose of this invention is the provision of a mobile cabinet of attractive appearance which, when in use, is adapted to place the adjuncts of faultless table service and piping hot food within easy reach of the hostess throughout an entire meal, and while she is seated comfortably at the table.

A more specific object of the invention is to provide a wheeled cupboard with readily accessible compartments for linen, dishes and silver; combined with a series of temperature controlled receptacles within which food can be appetizingly displayed and at the same time maintained at its proper serving temperature.

Another object is the provision of a unit of the above character, portions of which can be moved to open or closed position to expose or conceal the contents of the cabinet, and which when entirely closed constitutes an unobtrusive but attractive piece of furniture.

A further object is to provide a serving unit which makes it possible to serve food at the table, directly from the vessel in which it has been cooked, with all the attendant advantages of fewer dishes, and food at its best, but with no embarrassing display of pots and pans that are unsightly and awkward to handle.

Still another object is the provision of a compact portable serving cabinet in which regularly used china, silver and linen can be stored ready for use, so that it is only necessary to transfer food receptacles from the stove to the serving wagon in order to provide a complete table and food service ready to be wheeled into position.

Further objects and advantages of the invention will become more apparent during the course of the following description when taken in connection with the accompanying drawings.

In the drawings wherein like numerals are employed to designate like parts throughout the same:

Figures 1, 2:
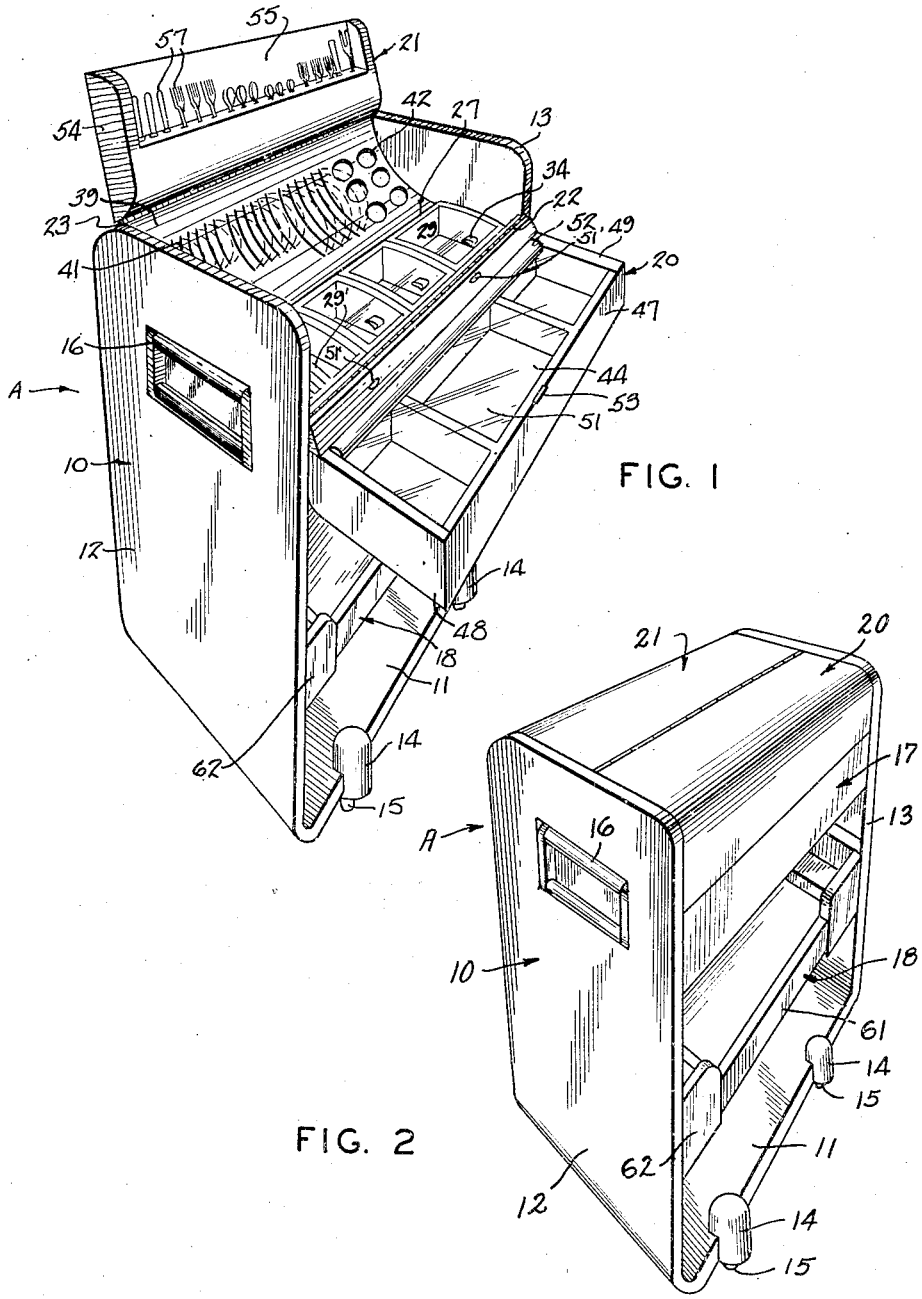
Fig. 1 is a perspective view of the serving wagon of the invention, with both sections of its cover or top in open position.
Fig. 2 is a view similar to Fig. 1 but on a reduced scale and showing the cover sections closed.

Referring now more particularly to the drawings, the complete serving wagon, which has been designated in its entirety by the letter A, may be made of wood, metal, plywood, or other suitable material. As shown, it is substantially rectangular in shape and includes a U shaped frame 10 which forms the bottom 11 and opposite side members 12 and 13 of the wagon. Partially inset into the bottom 11, adjacent its four corners, are short posts 14 provided with rounded tops and carrying in their lower ends the casters or wheels 15 upon which the wagon is adapted to be moved. Suitable handles 16 are formed at convenient locations on the side members 12 and 13.

Extending between the sides 12 and 13, and positioned flush with their upper edges, is a cabinet or cupboard 17 which provides the principal carrying and storage space in the wagon. This is supplemented, however, by an intermediate shelf 18, and the bottom 11 of the frame 10 also furnishes additional shelf space.

The cabinet 17 is in the form of a housing 19 that is substantially rectangular in shape, but with its longitudinal sides slanting inwardly from top to bottom, and is closed by two cover sections 20 and 21 hinged at 22 and 23 respectively. Positioned at the front of the housing is a warming table or food conditioning unit 24 comprising a body portion in the form of a rectangular double walled shell 25 filled with insulation 26 and provided with a series of recesses 27 for receiving cooking vessels 29 or other equipment from the kitchen.

While the serving wagon of this invention is not restricted to use in cooperation with any specific cooking device, it is particularly well adapted to serve food from a stove or cooking unit such as that shown and described in my copending application Serial No. 466,582, filed Nov. 23, 1942 and issued Jan. 4, 1949 as Patent No. 2,457,877. In that case the cooking unit is of the "well-type" and is built to accommodate the cooking vessels designated 29 in the instant application.

Although not essential, it is preferred that the cooking vessels 29 be made square or rectangular with rounded corners, and of course the recesses 27 in which they fit are correspondingly shaped. When the cooking vessels are placed in the recesses 27, they are adapted to be supported by the top wall 30 of the shell 25 in such a way that they may be readily removed. To this end each vessel 29 is provided at its upper end with a rim 31 adapted to rest within a slight annular depression 32 surrounding the respective recessed portion, when the vessel is lowered into its recess. With such a construction, the cooking vessels may be readily transferred back and forth between the stove and the serving wagon or removed as desired for filling, serving, and cleaning.

Figure 3:
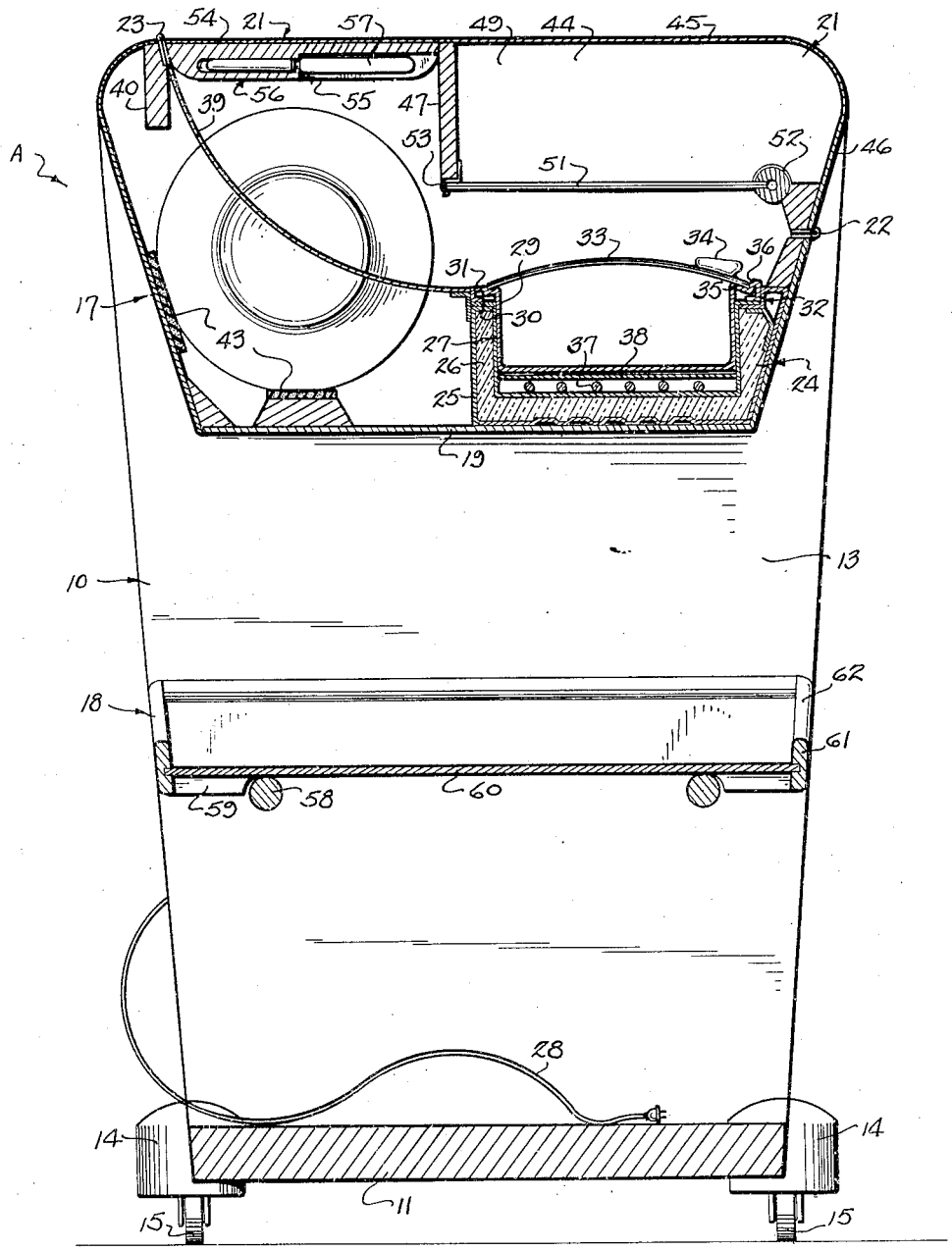
Fig. 3 is a vertical sectional view taken substantially on the line 3—3 in Fig. 2.

Each cooking vessel 29 is also provided with a cover 33 preferably consisting of a plate of tempered glass, which may be either flat or bent, and is provided with handle 34 secured thereto in any suitable manner. The glass cover plate 33 is supported upon the rim 31 of the cooking vessel and for this purpose the said rim may be formed, as shown in Fig. 3, with a substantially horizontal ledge 35 upon which the cover plate rests, and with a substantially vertical shoulder 36 for holding it against accidental displacement.

The recesses 27 are preferably made of varying sizes so as to accommodate cooking vessels of different capacities, and recesses may also be provided to receive toasters, waffle irons, coffee makers and other devices which are convenient to have in proximity to the table during the course of a meal. For example, a toaster is indicated at 29' (Fig. 1) and this, as well as other electrical appliances, can either be built into the serving wagon or merely slipped into an appropriately shaped recess before bringing the wagon in from the kitchen. In the later event, suitable electrical contacts can be provided in the recess where they will be automatically engaged by similar contacts on the appliance when it is inserted in the recess. The necessary electrical current can be supplied from any floor or wall outlet by means of a common cord and plug connection 28 leading to the electrical circuit of the serving wagon.

The insulated shell 25 will of course act to maintain the temperature of the foods in the vessels when they are placed in the recesses. However, in many cases it may be found desirable to actually heat the food while in the serving wagon, and for this purpose electrical heating elements 37 are installed in the bottom of the recesses for operation from suitable rheostatic controls (not shown). A baffle plate or heat spreader 38 may be interposed between the heating element and the bottom of the pan if desired, and it will be understood that cooling rather than heating elements may be provided in certain of the recesses. With the heater arrangement, food can be served sizzling hot or maintained at high temperatures over long periods. Or, foods that have been partially cooked in the kitchen may be brought to their final state of perfection at the table and then served immediately.

As pointed out above, in addition to the provisions for serving perfectly conditioned food, the serving wagon also makes readily available a rather complete service of china, silver and linen. To this end the housing 19 is provided with a curved partition 39 extending between the back wall of the shell 25 and a stringer 40 adjacent the upper rear corner of the housing and upon which the rear cover section 21 is hinged. The partition 39 is provided with a series of laterally extending slits 41 of different extent for receiving varying sized dishes, and with a series of openings 42 for cups or glasses. Mounted beneath the partition 39, upon the inner walls of the housing 19, are suitable supports 43 for the dishes. These are preferably provided with a contacting surface of some soft resilient material such as sponge rubber to protect the china from breakage or chipping and to prevent rattling.

The proximity of the china storage area to the hot food compartment will normally result in this area also serving as a plate warming compartment. By the provision of suitable ducts (not shown) to divert surplus heat from the shell 25, together with the proper arrangement of insulation, this feature of providing dishes that are at the proper temperature can be regulated and controlled.

The two cover sections 20 and 21 which meet near the middle of the cabinet when in closed position, also serve as a storage space for linen and silverware respectively. Thus, the forward section 20, which extends out horizontally from the serving wagon when in open position, forms a compartment 44 having a bottom wall 45 and one side wall 46 which follow the outline of the housing 19 when the cover section is in closed position. The opposite side wall 47 and two end walls 48 and 49 are vertically arranged and are preferably made of materials that are similar in thickness and finish to the end portions 12 and 13 of the frame 11. The compartment 44 can be divided up by suitable partitions, as shown in Fig. 1, and is provided with a transparent cover 51 of tempered heat-resisting glass. The cover 51 is hinged as at 52 to permit it to be opened when the cover section is in open position; and is engaged by a spring clip or other fastening means 53 to hold it shut when the cover section is in closed position.

The rear cover section 21 is adapted to be moved upwardly to the position shown in Figs. 1 and 3 when opened and consists of a flat piece of material, the outer surface of which matches and follows the contour of the cabinet when closed, while the inner surface has fixed thereto a block or holder 54. This block 54 is substantially rectangular in shape with deeply rounded, inner longitudinal edges and is cut out as at 55 and provided with recesses 56 opening into the cut-out portion for receiving knives, forks, spoons and the like 57.

The shelf 18 is supported between the cabinet 17 and the bottom 11 of the frame 10 upon rods or the line 58 extending between the opposite side members 12 and 13. The shelf is loose on the rods, being maintained in position by locating blocks 59, and consists essentially of a flat bottom member 60 carrying side boards 61. The side boards may be higher at some points than at others as shown at 62, and the shelf space may be divided by suitable partitions.

As already noted, when the cover sections 20 and 21 of the serving wagon are closed, it becomes an attractive but unobtrusive piece of furniture which may be pushed out of the way or used as a rolling table, as desired. At this time, the dishes, linen, silver and cooking vessels can be stored in their respective receptacles where they are always ready for use.

In preparing a meal, the cooking vessels can be removed from the serving wagon as a preliminary to the preparation of the food, although with the cooking unit disclosed in application Serial No. 466,582, filed November 23, 1942 and issued Jan. 4, 1949 as Patent No. 2,457,877, a duplicate set of cooking utensils that are already in the stove would be used. At the proper time the vessels containing the cooked food are transferred from the stove to the serving wagon which can then be closed and wheeled into the dining space.

Arriving at the table, the cabinet is opened by throwing back the cover sections 20 and 21. When this is done the top of the glass cover 51 should be flush with the top of the table and when the table top too is of glass and is similar in finish to the serving wagon, the two will appear as parts of a single unit. The table can be completely set from the serving wagon with covers, china and silver from the various compartments and when the cover section 51 is closed, its heat-resisting glass top will function as a serving shelf on which hot dishes can be placed without damage.

The lower portions of the cooking vessels will be effectively concealed within the recesses 27, while the food can be clearly seen through the transparent glass tops 33. At the same time the different kinds of food can be kept at exactly the right temperature by proper control of the temperature control units within the recesses, and can be served directly from the cooking vessels by merely removing the transparent covers 33. Used dishes and linen can be placed out of sight upon the shelf space 11 and 18 for subsequent removal.

Electrical appliances for which no other provision is made in the serving wagon can be placed on the combined glass cover and serving shelf 51 and plugged into one or the other of the electrical outlets 51'.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim:

A portable serving apparatus of the character described, including a housing, a food serving unit within said housing comprising a recessed body portion adapted to receive a food containing vessel, a concave partition within and closing a portion of said housing and provided with dish receiving openings, resilient supporting means behind certain of said openings for engagement by the dishes when they are received within the openings, a plurality of cover sections for said housing, one of said sections being adapted to assume a substantially vertical position when open and the other section being adapted to extend outwardly from the housing in a horizontal plane when in open position, a receptacle for articles of table service associated with each of said cover sections, and a transparent cover for the receptacle associated with said second-mentioned cover section.

HALBERT CRESTON DONER.

REFERENCES CITED

The following references are of record in the file of this patent:

UNITED STATES PATENTS

| Number | Name | Date |
|---|---|---|
| 1,505,299 | Stirn | Aug. 19, 1924 |
| 1,513,357 | Webber | Oct. 28, 1924 |
| 1,585,834 | Drinkwater | May 25, 1926 |
| 1,850,193 | Zahner | Mar. 22, 1932 |
| 1,948,937 | De Muth | Feb. 27, 1934 |
| 1,962,454 | Meanor et al. | June 12, 1934 |
| 2,266,901 | Parsons | Dec. 23, 1941 |
| 2,269,689 | Reichold | Jan. 13, 1942 |
| 2,341,648 | Parr | Feb. 15, 1944 |
| 2,346,705 | Sabin | Apr. 18, 1944 |